United States Patent
Couillet et al.

(10) Patent No.: US 8,442,135 B2
(45) Date of Patent: May 14, 2013

(54) PROCESS AND APPARATUS FOR PERFORMING INITIAL CARRIER FREQUENCY OFFSET IN AN OFDM COMMUNICATION SYSTEM

(75) Inventors: Romain Couillet, Antibes (FR); Merouane Debbah, Gif sur Yvette Cedex (FR)

(73) Assignee: St-Ericsson SA, Plan-les-Ouates (CH)

( * ) Notice: Subject to any disclaimer, the term of this patent is extended or adjusted under 35 U.S.C. 154(b) by 0 days.

(21) Appl. No.: 13/142,589

(22) PCT Filed: Dec. 29, 2009

(86) PCT No.: PCT/EP2009/009315
§ 371 (c)(1),
(2), (4) Date: Aug. 29, 2011

(87) PCT Pub. No.: WO2010/076024
PCT Pub. Date: Jul. 8, 2010

(65) Prior Publication Data
US 2011/0305285 A1 Dec. 15, 2011

(30) Foreign Application Priority Data
Dec. 31, 2008 (EP) .................................... 08368028

(51) Int. Cl.
*H04L 27/28* (2006.01)
(52) U.S. Cl.
USPC ............ 375/260; 375/259; 375/316; 375/346

(58) Field of Classification Search ................... 375/260, 375/259, 316, 346
See application file for complete search history.

(56) References Cited

U.S. PATENT DOCUMENTS 7,609,789 B2* 10/2009 Leshem ......................... 375/346
2007/0218854 A1* 9/2007 Lawrence et al. ............. 455/310

OTHER PUBLICATIONS

International Search Report for PCT/EP2009/009315 mailed Aug. 10, 2010.
Written Opinion for PCT/EP2009/009315 mailed Aug. 10, 2010.
Moose, P.H., "A Technique for Orthogonal Frequency Division Multiplexing Frequency Offset Correction," IEEE Transactions on Communications, IEEE Service Center, Piscataway, NJ, US, vol. 42, No. 10, Oct. 1, 1994, pp. 2908-2914, XP002019915.
Cui, T., et al., "Maximum-likelihood carrier frequency offset estimation for OFDM system offset estimation for OFDM systems over frequency-selective fading channels," Communications, 2005, ICC 2005, 2005 IEEE International Conference, Seoul, Korea, vol. 4, May 16-20, 2005, pp. 2506-2510, XP010825631.

\* cited by examiner

*Primary Examiner* — Shuwang Liu
*Assistant Examiner* — Michael Neff
(74) *Attorney, Agent, or Firm* — Potomac Patent Group PLLC (57) ABSTRACT

A carrier frequency offset between a base station and a receiver of an Orthogonal Frequency Division Multiplex communication system is estimated by maximizing a function depending on the carrier frequency offset. The function is built using a sequence received by the transmitter when the base station emits a pilot sequence, taking into consideration a variance of the noise and a presumed length of the channel.

13 Claims, 7 Drawing Sheets

PROCESS AND APPARATUS FOR PERFORMING INITIAL CARRIER FREQUENCY OFFSET IN AN OFDM COMMUNICATION SYSTEM

TECHNICAL FIELD

The invention relates to wireless digital communication and particularly to a process for performing the estimation of a Carrier Frequency Offset in a OFDM communication system, during the initial synchronization steps (i.e. prior to channel estimation).

BACKGROUND ART

The Orthogonal Frequency Division Multiplexing (OFDM) modulation is a widely developing technique in the field of wireless digital communications thanks to the high possibilities offered by simplified digital signal processing based on Discrete Fourier Transform computations.

However, before a signal being received by a User Equipment (UE) may be properly processed, a preliminary but critical synchronization step has to be achieved including the estimation of the so-called Carrier Frequency Offset (CFO). Indeed, because of the mismatches of the internal oscillators and also because of the Doppler effect resulting from mobile communications, the frequencies at the base station (eNodeB) and at the receiving terminal (UE) may differ, and such a difference might be detrimental to the targeted transmission rate. In particular, if the CFO problem is not properly corrected, it is hazardous to perform the Discrete Fourier Transform stage at the receiver. In many systems, such as 3GPP-LTE, a first rough synchronization step is performed thanks to a primary synchronization sequence (PSS) which at this point is the only known pilot sequence accessible to the receiver.

Before performing the next synchronization steps which require to use the DFT block at the reception, it is critical to have a good CFO estimate; otherwise the performance of the subsequent synchronization steps might be heavily impaired.

A first, very well known, technique for estimating the CFO is disclosed by P. H. Moose in "*A technique for orthogonal frequency-division multiplexing frequency offset correction*", in IEEE Trans. on Communications, vol. 42, no. 10, pp. 2908-2914, October 1994. The technique is based on the use of a specific pilot sequence, a pilot OFDM symbol composed of two identical vectors.

Such a technique presents the significant advantage of being workable without the knowledge of the channel characteristics and, therefore, is highly useful during the first or coarse synchronization process when only limited information is available to the receiver. The clear drawback of this well-known technique lies in the fact that the repetitive transmission of the Moose sequence is a large waste in terms of spectral efficiency since this sequence is not in general reusable to other synchronization purposes.

For such a reason in particular, the use of the Moose sequence has been excluded in some standards, such as the 3GPP-LTE for instance, and there is only provided the so-called Primary Synchronization Sequence (PSS) for achieving the estimation of the CFO. In theory, by means of a systematic scanning of a dense discrete set of possible central frequencies, it is feasible to evaluate the CFO from the detection of the PSS but such a systematic scanning would require a great amount of digital processing resources and thus increase the processing costs of the receiver.

It is therefore desirable to have an alternative technique which can achieve CFO estimation with limited digital processing resources.

SUMMARY OF THE INVENTION

It is an object of the present invention to provide a process for estimating the Carrier Frequency Offset (CFO) between a receiver and a transmitter in an OFDM communication system.

It is another object of the present invention to provide a process and apparatus which achieves CFO estimation on the basis of any predetermined pilot sequence.

It is still another object of the present invention to provide a process and apparatus for performing CFO estimation on the basis of the so-called Primary Synchronization Signal (PSS).

It is still another object of the present invention to provide a process and apparatus for performing CFO estimation for a Long Term Evolution (LTE) communication system.

Those and other objects are achieved by means of the process according to the present invention which is performed in a communication device receiving a known (pilot) sequence $x=(x_0, x_1, x_2 \ldots, x_{N-1})^T$ of length N.

The process involves the determination of a value of $\theta$ which maximizes the formula:

$$C(\theta) = -d_\theta^H Y^H X (X^H X + \sigma^2 Q^{-1})^{-1} \frac{1}{\sigma^2} X^H Y d_\theta$$

where $$X = \begin{pmatrix} x_0 & x_{N-1} & \cdots & x_{N-L-1} \\ x_1 & x_0 & \cdots & x_{N-L-2} \\ \vdots & \vdots & \vdots & \vdots \\ x_{L-2} & x_{L-3} & \cdots & x_{N-1} \\ x_{L-1} & x_{L-2} & \cdots & x_0 \\ \vdots & \vdots & \vdots & \vdots \\ x_{N-1} & x_{N-2} & \cdots & x_{N-L} \end{pmatrix}$$

$$d_\theta = \left(1, e^{2\pi \frac{i\theta}{N}}, \ldots, e^{2\pi \frac{(N-1)i\theta}{N}}\right)^T;$$

Y is the diagonal matrix of main diagonal y;

$\sigma^2$ is the noise power and Q is the assumed channel time covariance matrix.

In one embodiment, the Q matrix is set to be equal to $1/L\, I_L$, with $I_L$ the L×L identity matrix and L corresponding to the presumed length of the channel (i.e. the approximate number of time samples over which the channel spreads).

Preferably, a dichotomic process is used for the purpose of estimating the value of $\theta$ which maximizes $C(\theta)$, such as a steepest descent algorithm In one embodiment, the process involves the steps of:

receiving an input signal $y=(y_0, \ldots, y_{N-1})^T$;

detecting said pilot signal;

computing an estimation of the variance $\sigma^2$ of the noise;

setting an estimate of the channel time covariance matrix Q, for instance equal to $1/L\, I_L$, computing a matrix A as follows:

$$A = Y^H X (X^H X + \sigma^2 Q^{-1})^{-1} \frac{1}{\sigma^2} X^H Y$$

where X is a pseudo-circulant matrix defined from said pilot signal
$x = (x_0, x_1, x_2 \ldots, x_{N-1})^T$ as follows:

$$X = \begin{pmatrix} x_0 & x_{N-1} & \ldots & x_{N-L-1} \\ x_1 & x_0 & \ldots & x_{N-L-2} \\ \vdots & \vdots & \vdots & \vdots \\ x_{L-2} & x_{L-3} & \ldots & x_{N-1} \\ x_{L-1} & x_{L-2} & \ldots & x_0 \\ \vdots & \vdots & \vdots & \vdots \\ x_{N-1} & x_{N-2} & \ldots & x_{N-L} \end{pmatrix}$$

Y is the diagonal matrix of main diagonal y;
$\sigma^2$ is the noise power.
computing the N−1 values of $\tilde{a}$ in accordance with the formula:

$$\tilde{a}_k = \sum_{m=1}^{N-k} A_{k+m,m}$$

with $A_{ij}$ the entries of matrix A.
computing the following vectors:

$$\tilde{b}_\Re^T = \Re[\tilde{a}_1, 2\tilde{a}_2, \ldots, (N-1)\tilde{a}_{N-1}]$$

$$\tilde{b}_\Im^T = \Im[\tilde{a}_1, 2\tilde{a}_2, \ldots, (N-1)\tilde{a}_{N-1}]$$

initializing a loop with the two variables:
$\theta_{min} = -\frac{1}{2}$ and
$\theta_{max} = \frac{1}{2}$
computing the value of $$d = \tilde{b}_\Re^T \cdot s_\theta + \tilde{b}_\Im^T \cdot c_\theta$$

with $$c_\theta^T = [\cos(2\pi\theta/N), \ldots, \cos(2\pi(N-1)\theta/N)]$$

$$s_\theta^T = [\sin(2\pi\theta/N), \ldots, \sin(2\pi(N-1)\theta/N)]$$

testing the sign of d;
if d is positive, then updating the value of $\theta_{min}$ as follows:

$$\theta_{min} = (\theta_{min} + \theta_{max})/2$$

if d is negative, then updating the value of $\theta_{max}$ as follows:

$$\theta_{max} = (\theta_{min} + \theta_{max})/2$$

repeating the preceding steps until the completion of the loop and, when the loop completes,
returning an estimation of said CFO in accordance with the formula:

$$\hat{\theta} = [\theta_{min} + \theta_{max}]/2$$

The invention also provides a communication apparatus comprising a receiver for estimating the CFO for an OFDM communication system, which comprises:
a receiver for receiving an input signal comprising a pilot sequence $x = (x_0, x_1, x_2 \ldots, x_{N-1})^T$, means for determining a value of θ which maximizes the formula:

$$C(\theta) = -d_\theta^H Y^H X (X^H X + \sigma^2 Q^{-1})^{-1} \frac{1}{\sigma^2} X^H Y d_\theta$$

where $$X = \begin{pmatrix} x_0 & x_{N-1} & \ldots & x_{N-L-1} \\ x_1 & x_0 & \ldots & x_{N-L-2} \\ \vdots & \vdots & \vdots & \vdots \\ x_{L-2} & x_{L-3} & \ldots & x_{N-1} \\ x_{L-1} & x_{L-2} & \ldots & x_0 \\ \vdots & \vdots & \vdots & \vdots \\ x_{N-1} & x_{N-2} & \ldots & x_{N-L} \end{pmatrix}$$

$$d_\theta = \left(1, e^{2\pi \frac{i\theta}{N}}, \ldots, e^{2\pi \frac{(N-1)i\theta}{N}}\right)^T;$$

Y is the diagonal matrix of main diagonal y;
$\sigma^2$ is the noise power and Q is the channel time covariance matrix.

The invention is particularly adapted for the estimation of the CFO for a 3GPP-LTE communication network and any type of mobile OFDM-based network with no CFO-dedicated synchronization sequence.

DESCRIPTION OF THE DRAWINGS

Other features of one or more embodiments of the invention will best be understood by reference to the following detailed description when read in conjunction with the accompanying drawings.

DESCRIPTION OF THE PREFERRED EMBODIMENTS

It will now be described how to estimate the CEO from the sole knowledge of any predetermined pilot sequence, for instance the so-called Primary Synchronization Signal (PSS). However, it should be clear that the PSS is only indicated as an example and that other pilot sequences may be considered by the skilled man.

In the following, boldface lower-case symbols represent vectors, capital boldface characters denote matrices ($I_N$ is the N×N identity matrix). The Hermitian transpose is denoted $(.)^H$. The set of N×M matrices over the algebra A is denoted M(A, N, M). The operators det(X) and tr(X) represent the determinant and the trace of matrix X, respectively. The symbol E[.] denotes expectation.

Consider a pair of transmitter and receiver communicating through a noisy channel. The transmitter sends a data sequence x which the receiver captures as a sequence y. The transmission vector channel is denoted h. The noise is modeled as an additive white Gaussian (AWGN) sequence w. The extent of knowledge of the receiver, prior to data transmission, is denoted I. In particular, the receiver frequency reference is not perfectly aligned to that of the transmitter: this introduces a frequency offset θ whose knowledge to the receiver is summarized into the density function p(θ|I). By inductive reasoning, we provide in the following an expression of the optimal inference the receiver can make on (θ|y, I) which we apply to the example of data-aided CFO estimation in OFDM.

Consider an OFDM system of N subcarriers. The transmitter sends a time-domain pilot sequence $x=(x_0, \ldots, x_{N-1})^T$ (cyclic prefix excluded), received as a sequence $y=(y_0, \ldots, y_{N-1})^T$ (cyclic prefix discarded). The transmission channel is discretized in L taps $h=(h_0, \ldots, h_{L-1})^T$ and the AWGN noise $w=(w_0, \ldots, w_{N-1})^T$ has entries of variance $E[|w_k|^2]=\sigma^2$. For the sake of simplicity, it will not be considered below the information contained in the cyclic prefixes. Let θ represent the CFO to be estimated at the receiver normalized to the subcarrier spacing, i.e. θ=1 is a frequency mismatch of one subcarrier spacing.

A CFO produces in OFDM a simple phase rotation of all transmitted time-domain symbols $x_k$ of an angle $2\pi k\theta/N$. While it seems feasible to track the CFO in the time domain when the transmitted pilot sequence x—for instance the PSS—is assumed to be known, it should be noticed that channel estimation is not accessible to the UE during the initial synchronization step, thus preventing direct deciphering of the impact of the channel on the time-domain symbols.

It is proposed to consider the maximum a posteriori value for θ given the received signal y defined as $$y = Hx + n \quad (1)$$

where H is the circulant matrix of the time-domain OFDM channel (its first row is h) and n the white Gaussian noise process.

This classical model can be rewritten $$y = Xh + n \quad (2)$$

where h is composed of the L time-domain taps of the channel response and X is the pseudo-circulant matrix defined as $$X = \begin{pmatrix} x_0 & x_{N-1} & \cdots & x_{N-L-1} \\ x_1 & x_0 & \cdots & x_{N-L-2} \\ \vdots & \vdots & \vdots & \vdots \\ x_{L-2} & x_{L-3} & \cdots & x_{N-1} \\ x_{L-1} & x_{L-2} & \cdots & x_0 \\ \vdots & \vdots & \vdots & \vdots \\ x_{N-1} & x_{N-2} & \cdots & x_{N-L} \end{pmatrix}$$

It is assumed that the CFO is known to be comprised in the set $\theta \in [-\frac{1}{2}, \frac{1}{2}]$, where θ is normalized to the subcarrier spacing. We want to maximize the probability p(θ|y).

One may assume uniform prior distribution of p(θ) in the set $\theta \in [-\frac{1}{2}, \frac{1}{2}]$, then the maximization problem is concave in the variable θ and therefore can be solved by steepest descent algorithms. After computation, it has been observed that maximizing p(θ|y) is equivalent to maximize the function C(θ) defined as $$C(\theta) = -d_\theta^H Y^H X (X^H X + \sigma^2 Q^{-1})^{-1} \frac{1}{\sigma^2} X^H Y d_\theta$$

where $$X = \begin{pmatrix} x_0 & x_{N-1} & \cdots & x_{N-L-1} \\ x_1 & x_0 & \cdots & x_{N-L-2} \\ \vdots & \vdots & \vdots & \vdots \\ x_{L-2} & x_{L-3} & \cdots & x_{N-1} \\ x_{L-1} & x_{L-2} & \cdots & x_0 \\ \vdots & \vdots & \vdots & \vdots \\ x_{N-1} & x_{N-2} & \cdots & x_{N-L} \end{pmatrix}$$

$$d_\theta = \left(1, e^{2\pi \frac{i\theta}{N}}, \ldots, e^{2\pi \frac{(N-1)i\theta}{N}}\right)^T;$$

Y is the diagonal matrix of main diagonal y;
$\sigma^2$ is the noise power.

where X is the pseudo-circulant matrix defined above, with a first column comprising the any pilot synchronization sequence $x=(x_0, x_1, x_2, \ldots, x_{N-1})^T$ (for instance the PSS), and the next column comprising the circular permutation of the elements of vector x, ie vector $(x_{N-1}, x_0, x_1, \ldots x_{N-2})^T$, and the next one comprising the next consecutive circular permutation $(x_{N-2}, x_{N-1}, x_0, \ldots, x_{N-3})^T$ and so on . . . .

The matrix Q is the channel time covariance matrix which is assumed to be known. In one particular embodiment, one sets $Q=1/L\ I_L$, with $I_L$ being the L×L identity matrix and L corresponding to the presumed length of the channel. It should be noticed that, generally speaking, L is not known a priori, but it has been advantageously observed that, to some extent, any non-trivial predetermined choice for L (and quite possibly wrong) does not alter much the results and the efficiency of the CFO estimation process. Therefore, the optimal maximum a priori solution simply consists in finding the value θ that maximizes C(θ).

I. Description of Embodiments

Figure 1:
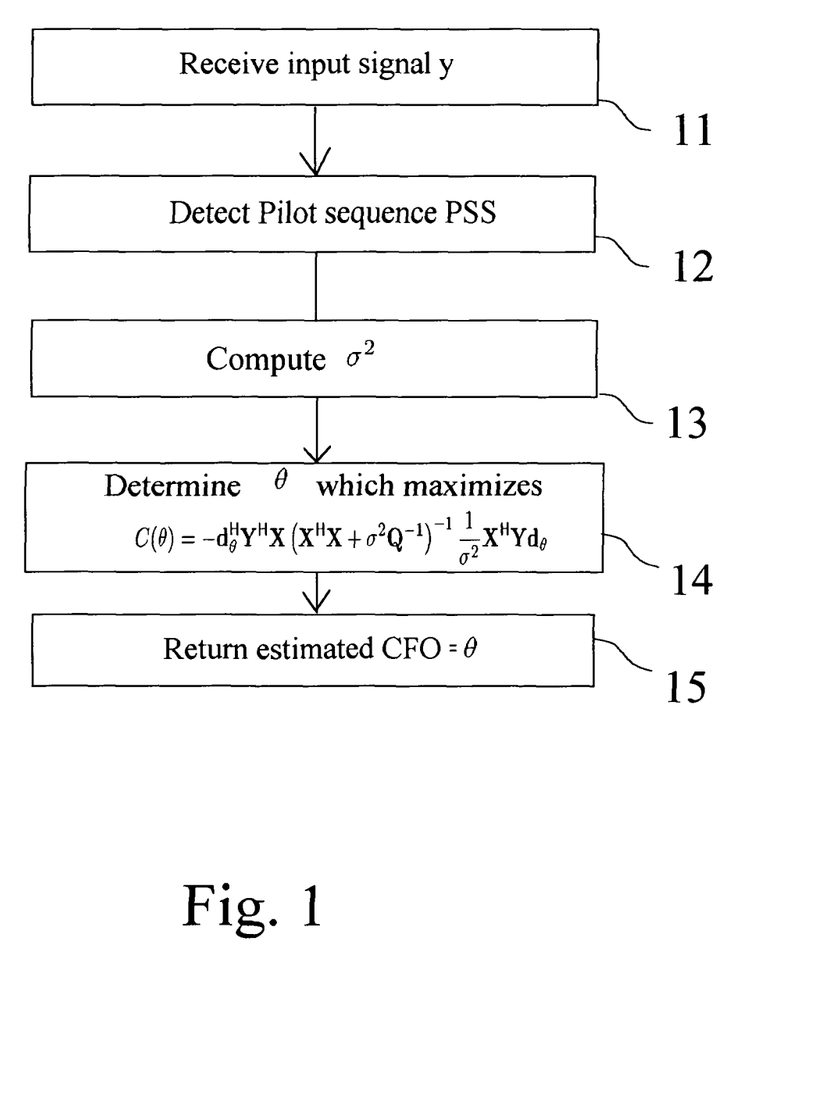
FIG. 1 illustrates a first embodiment of a process in accordance with the present invention.

With respect to FIG. 1, there is now described the basic steps which are involved in the CFO estimation process in accordance with the present invention.

The process is executed in any receiver of a OFDM communication system, receiving an input signal $y=(y_0, \ldots, Y_{N-1})^T$ in a step 11.

Then, the process proceeds with a step 12 consisting in the detection of the PSS pilot signal.

In a step 13, the process computes an estimation of the Signal to Noise Ratio (SNR) and therefore an evaluation of variance of the noise $\sigma^2$. Such evaluation is achieved by techniques and algorithms which are well known to a skilled man and which will not be developed with more details. For instance, the pilot sequence may be used for performing such evaluation.

In a step 14, the process proceeds with the computation of $$C(\theta) = -d_\theta^H Y^H X (X^H X + \sigma^2 Q^{-1})^{-1} \frac{1}{\sigma^2} X^H Y d_\theta$$

where $$X = \begin{pmatrix} x_0 & x_{N-1} & \cdots & x_{N-L-1} \\ x_1 & x_0 & \cdots & x_{N-L-2} \\ \vdots & \vdots & \vdots & \vdots \\ x_{L-2} & x_{L-3} & \cdots & x_{N-1} \\ x_{L-1} & x_{L-2} & \cdots & x_0 \\ \vdots & \vdots & \vdots & \vdots \\ x_{N-1} & x_{N-2} & \cdots & x_{N-L} \end{pmatrix}$$

$$d_\theta = \left(1, e^{2\pi \frac{i\theta}{N}}, \ldots, e^{2\pi \frac{(N-1)i\theta}{N}}\right)^T;$$

Y is the diagonal matrix of main diagonal y;
$\sigma^2$ is the noise power and $Q=1/L\ I_L$.
and identifies the particular value of $\theta$ that maximizes $C(\theta)$.

In one particular embodiment, a processing loop is initiated for the purpose of testing different values of $\theta$ and thus identifying the particular value which maximizes $C(\theta)$.

Alternatively, it has been observed that $C(\theta)$ is concave and therefore a dichotomy algorithm can be advantageously used for achieving a fast computation of the CFO estimation.

Once determined, the process returns in a step 15 the particular value identified in step 14 as being the estimated CFO.

As it will be apparent to the skilled man, the process which was described above can be embodied by means of different and numerous algorithms. In addition, it will be clear to the skilled man that the formula above may take various formal presentations showing equivalent computations.

Figure 2:
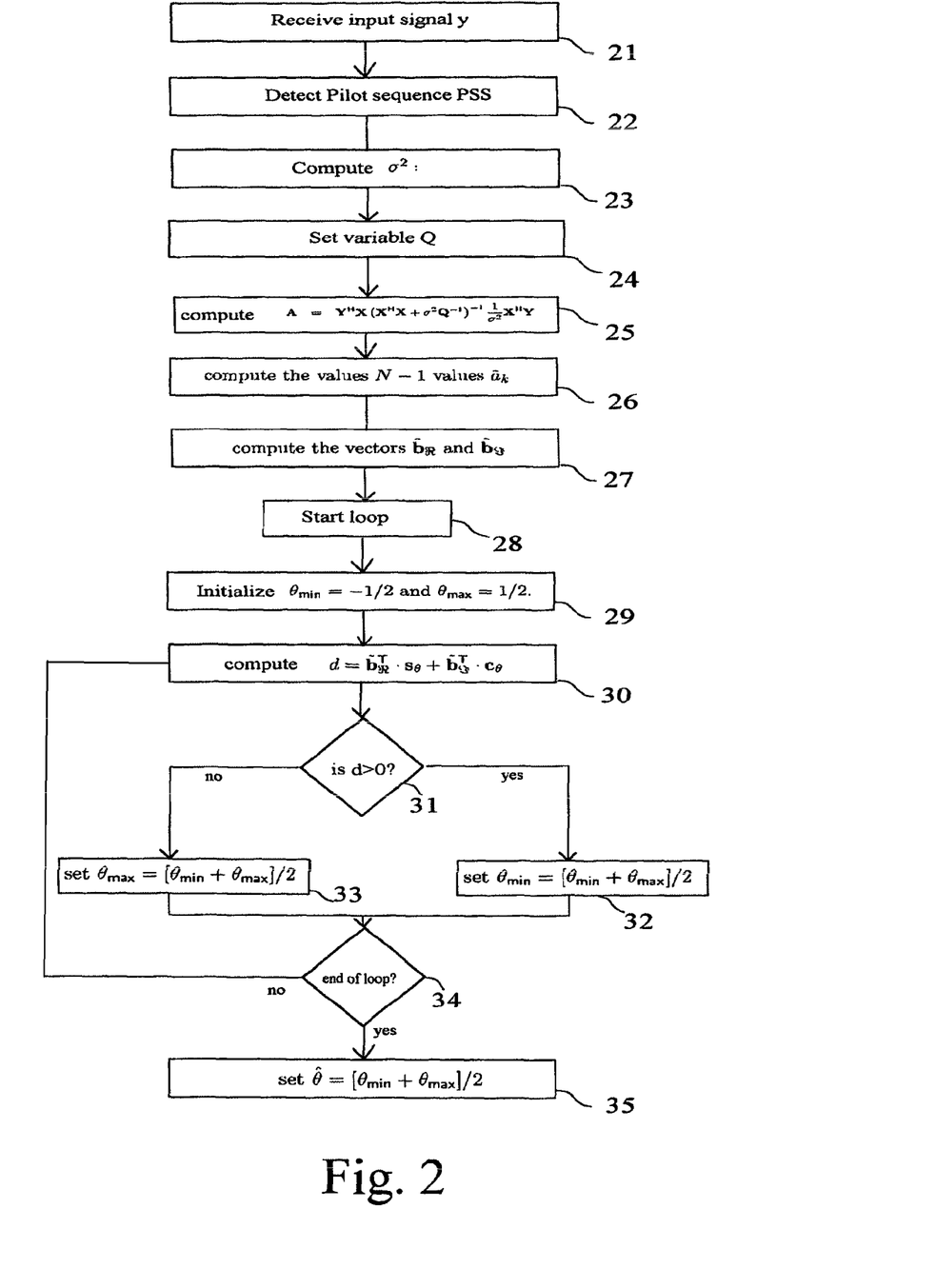
FIG. 2 illustrates a second embodiment of a process in accordance with the present invention.

With respect to FIG. 2, there will now be described a second embodiment of the invention which requires limited digital processing resources.

The second embodiment includes steps 21-23 which are identical to steps 11-13 of FIG. 1.

Therefore, after the computation of the value of $\sigma^2$, the process proceeds with a step 24 where the value of channel time covariance matrix Q is being set.

In one embodiment, the Q matrix is predetermined. Clearly, the same assumption made in FIG. 1 may be applicable, for instance $Q=1/L\ I_L$.

With the assumption made on matrix Q, the process then proceeds to a step 25 where the following matrix A (comprising elements $a_{n,m}$) is computed:

$$A = Y^H X (X^H X + \sigma^2 Q^{-1})^{-1} \frac{1}{\sigma^2} X^H Y$$

in which $$X = \begin{pmatrix} x_0 & x_{N-1} & \cdots & x_{N-L-1} \\ x_1 & x_0 & \cdots & x_{N-L-2} \\ \vdots & \vdots & \vdots & \vdots \\ x_{L-2} & x_{L-3} & \cdots & x_{N-1} \\ x_{L-1} & x_{L-2} & \cdots & x_0 \\ \vdots & \vdots & \vdots & \vdots \\ x_{N-1} & x_{N-2} & \cdots & x_{N-L} \end{pmatrix}$$

where X is the pseudo-circulant matrix defined above,
Y is the diagonal matrix of main diagonal y;
$\sigma^2$ is the noise power.

In the case of PSS for LTE, the size of the A matrix is 64×64.

In one particular embodiment, the process only computes half of matrix A since only the upper right coefficients $A_{n,m}$ with n>m, need to be known for the remaining part of matrix A as it will be apparent below.

In a step 26, the process then proceeds with the computation of the N−1 values of $\tilde{a}_k$ given by the following formula:

$$\tilde{a}_k = \sum_{m=1}^{N-k} A_{k+m,m}$$

Then, in a step 27, the process proceeds with the computation of the two following vectors:

$\tilde{b}_\Re^T = \Re[\tilde{a}_1, 2\tilde{a}_2, \ldots, (N-1)\tilde{a}_{N-1}]$ $\tilde{b}_\Im^T = \Im[\tilde{a}_1, 2\tilde{a}_2, \ldots, (N-1)\tilde{a}_{N-1}]$ Then, in a step 28, the process enters into a loop and, in a step 29, initializes the following two variables:
$\theta_{min} = -\frac{1}{2}$ and
$\theta_{max} = \frac{1}{2}$ The process then proceeds with a step 30 where the value of d (the derivative of $C(\theta)$ in point $\theta$) is computed:

$d = \tilde{b}_\Re^T \cdot s_\theta + \tilde{b}_\Im^T \cdot c_\theta$ with $c_\theta^T = [\cos(2\pi\theta/N), \ldots, \cos(2\pi(N-1)\theta/N)]$ $s_\theta^T = [\sin(2\pi\theta/N), \ldots, \sin(2\pi(N-1)\theta/N)]$ Then, in a step 31, a simple test is performed in order to determine whether d is positive or negative. Indeed, it has been observed that function $C(\theta)$ is concave between $(-\frac{1}{2}, \frac{1}{2})$, what opens the opportunity of a simple test on the sign of d for determining the maximum value of $C(\theta)$.

If d is found to be positive, then the process proceeds with a step 32 where the value of $\theta_{min}$ is updated as follows:

$\theta_{min} = (\theta_{min} + \theta_{max})/2$ and the process then proceeds to step 34

Conversely, if d is negative, then the process proceeds to a step 33 where the value of $\theta$ is updated as follows:

$\theta_{max} = (\theta_{min} + \theta_{max})/2$

The process then proceeds to a step 34 which is a new test on the end of the loop. If the loop is not terminated, then the process proceeds again to step 30.

If the loop is terminated, then the process proceeds with a step 35 where the estimated value of the CFO is computed as follows:

$\hat{\theta} = [\theta_{min} + \theta_{max}]/2$

The process then completes.

II. SIMULATION AND RESULTS

In the following, one may consider following we consider an OFDM transmission with N=128 subcarriers. We assume perfect timing offset alignment between the base station and the receiving terminal. A CFO mismatch $\theta$ is introduced. The receiver only knows that $\theta \in [-\frac{1}{2}, \frac{1}{2}]$.

Figure 3:
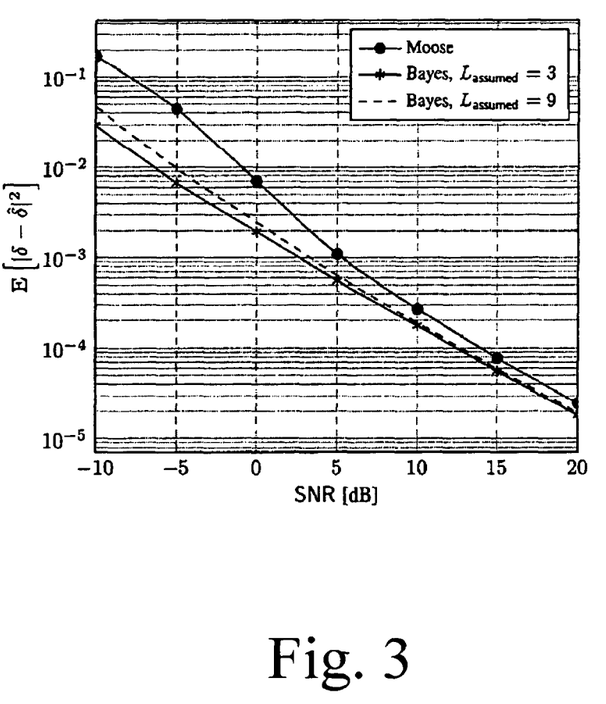
FIG. 3 shows a comparison of the CFO estimates resulting from the traditional Moose technique and the proposed invention, with N=128, L=3 and $L_{assumed} \in [3, 9]$

FIG. 3 shows a comparison of the CFO estimates resulting from the traditional Moose technique and the proposed invention, with N=128, L=3 and $L_{assumed} \in [3, 9]$. One considers a double-half sequence suggested by Moose and the proposed method is compared against the Moose's correlation algorithm on 20,000 channels and CFO realizations ($\theta$ is uniformly distributed in [−½, ½]). The channel length is set to L=3, while the a priori on the channel length is either considered known, i.e. $L_{assumed}$=3, or wrongly estimated, here $L_{assumed}$=9. The respective performances are analyzed in terms of average quadratic error $E[(\hat{\theta}-\theta)^2]$ There is observed a significant performance gain provided by the proposed invention, especially in low SNR regime. It can be seen that the invention is indeed more able to cope with the noise impairment which is more thoroughly modelled than in Moose's algorithm. Note also that a wrongly assigned prior p(θ|I) on the channel realization does not lead to critical performance decay; in the high SNR region, it is almost unimportant.

Figure 4:
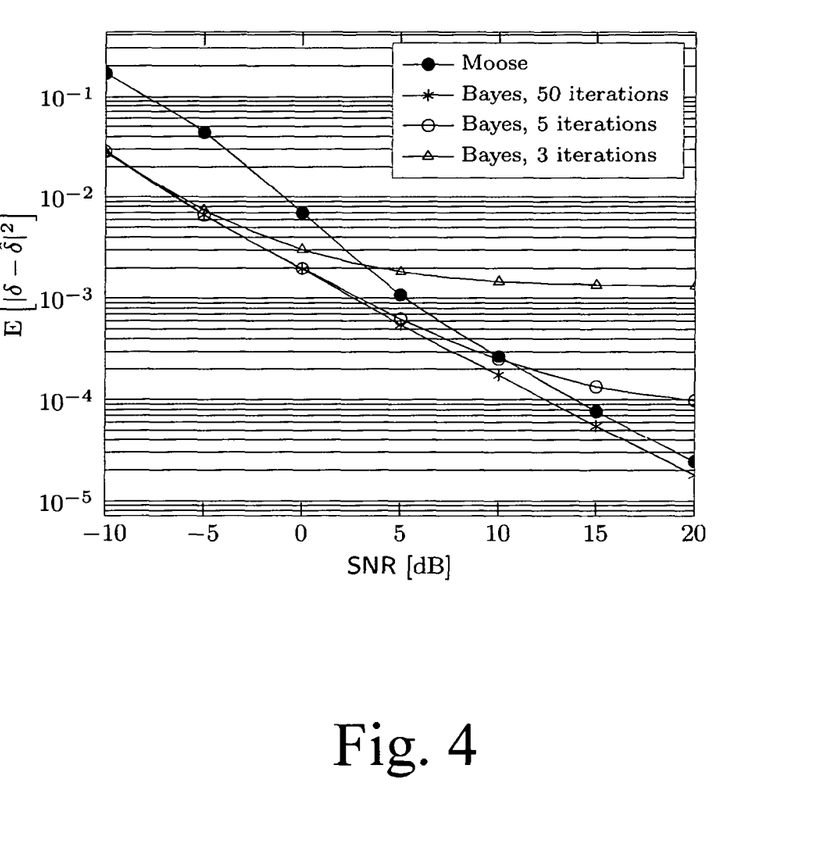
FIGS. 4-6 show comparative results with the use of the steepest descent algorithm of the invention, and with N=128, L=3, respectively with 3 to 50 iterations.
Figure 5:
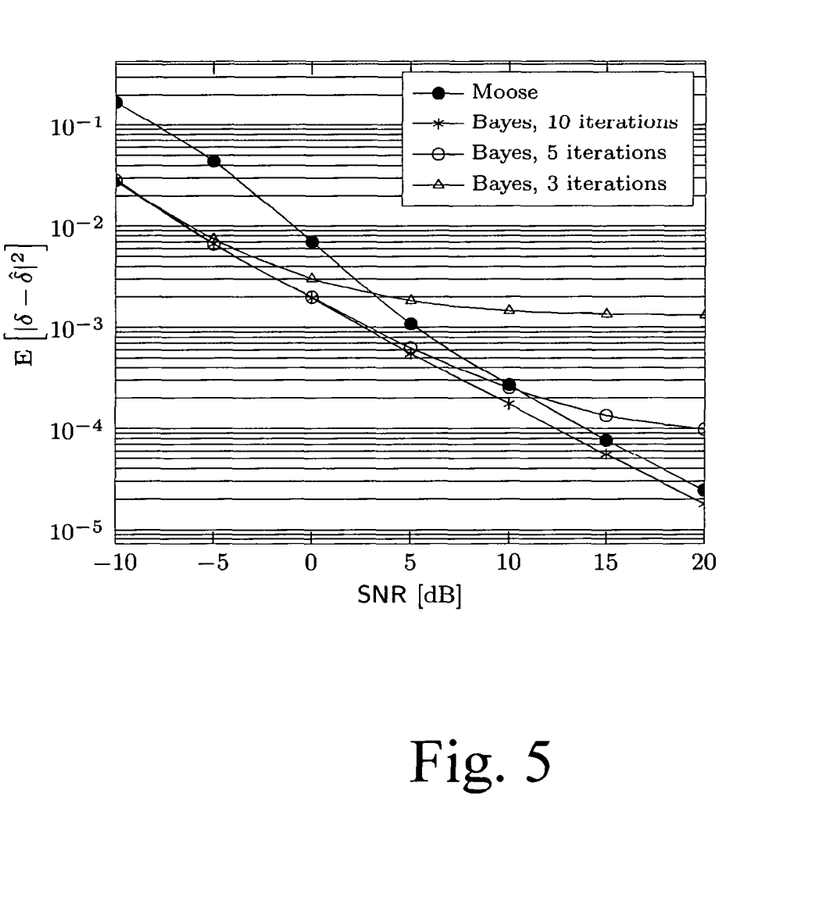
Figure 6:
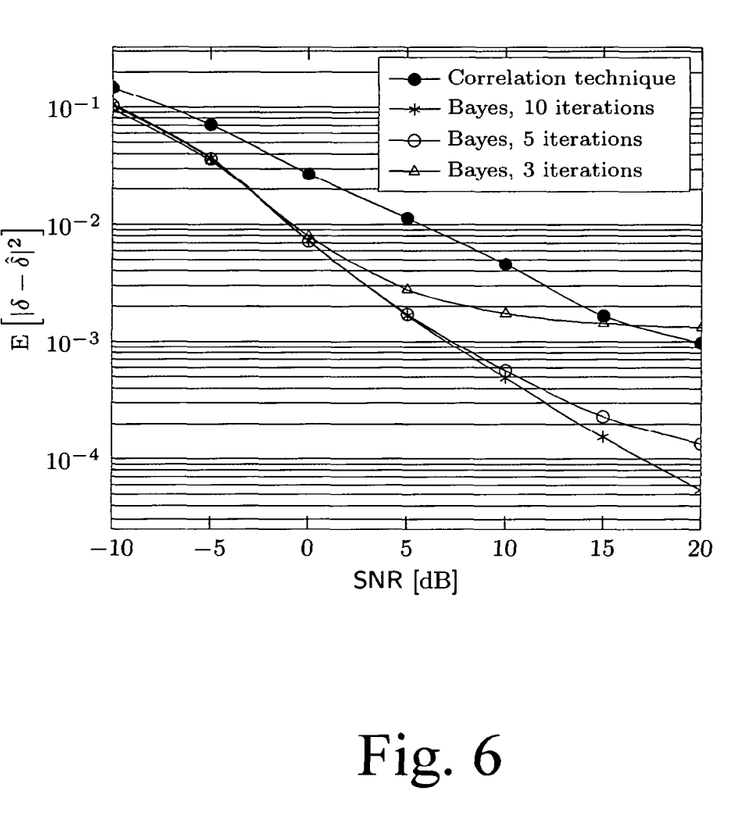

FIGS. 4-6 show the performance of the steepest descent algorithm which was described above. The system parameters are the same as in the previous simulation, with a correct prior $L_{assumed}$=3 on the channel length at the receiver. The termination constraint is simply the number of iterations k of the inner loop, which we limit to k=3, k=5, k=10 and k=50. It is observed that saturations appear for k<+∞, which are explained by the systematic error introduced by the minimal step size $2^{-k}$ in the iteration loop. For k>10, the performance plots (which we did not provide for clarity) fit the plot k=50 in the −15 dB to 10 dB SNR range. Note also that the saturated standard deviation (defined as $E[(\hat{\theta}-\theta)^2]^{1/2}$) for k=5 is around 1% of the subcarrier spacing, which corresponds to the maximum allowable CFO mismatch in most OFDM systems. Therefore, 5 iterations might be sufficient to ensure a reliable estimation of the CFO.

Figure 7:
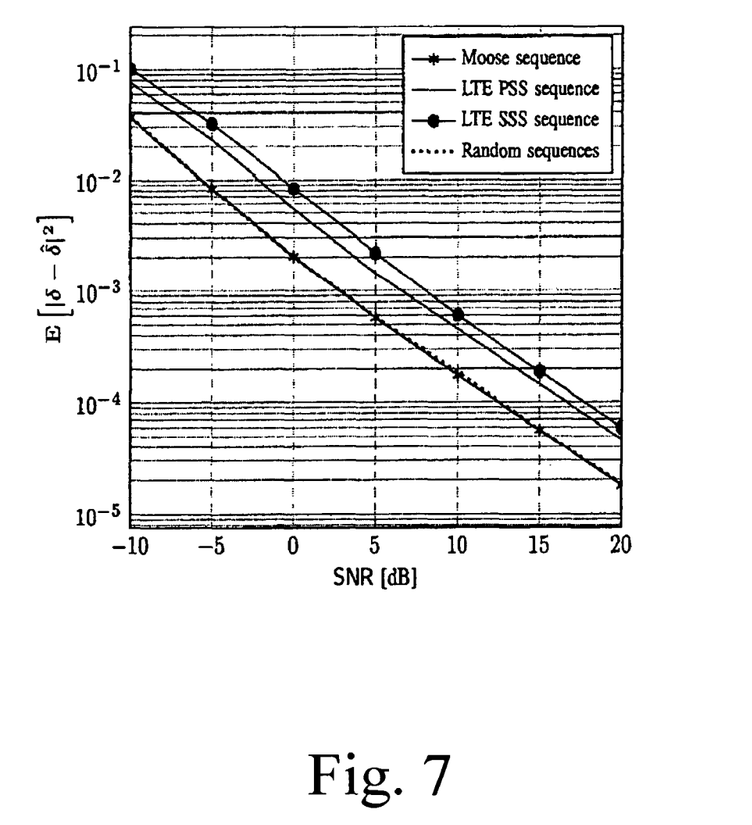
FIG. 7 illustrates the impact of the choice of the particular pilot sequence for executing the process of the invention

FIG. 7 illustrates the impact of the choice of the particular pilot sequence for executing the process of the invention. Moose's randomly generated double-half pilot sequences as well as QPSK random sequences are compared against the primary and secondary synchronization sequences (PSS, SSS) from the 3GPP Long Term Evolution standard. There is observed a large performance difference between those two types of pilots. This is simply due to the fact that both PSS and SSS are not of constant modulus over time; this makes part of the signal more sensible to noise and part of the signal less sensible to noise, but in average, this leads to less efficient pilots in terms of CFO estimation. It should be noticed that also Moose's sequence is in no way better than any randomly generated sequence, which demystifies the original insightful idea from Moose.

Applications of the Invention

This invention fits typically the needs of the 3GPP-LTE standard for which no sequence dedicated to CFO estimation is provided. Due to its generality, this method can be applied in many OFDM systems which seek for CFO estimation while not having access to the channel information. Since this scheme has a complexity which scales with the number of iterations of the algorithm, it can be adapted to rough low consumption estimates at the receiver as well as thin higher consumption estimates at the base station.

The invention is particularly adapted to the Long Term Evolution standard, during the PSS to SSS synchronization phases.

The invention provides CFO estimation process prior to channel estimation in OFDM for any available pilot sequence. This is a very advantageous effect which was not known with prior art techniques: usual CFO techniques come along with a dedicated sequence. With the new technique which is proposed, there is no need of any specific sequence. Furthermore, it has been observed that the process is particularly effective when the sequence is composed of symbols having constant amplitude. It is then more advantageous to run this method on the most appropriate pilots.

This invention eliminates the problem of initial synchronization prior to channel estimation. It can also help estimating the CFO from signals coming from interfering base stations whose channels have not been estimated. It is believed that no such general pilot-independent scheme has ever been proposed in the OFDM contest.

Furthermore, it has been observed that the technique described above shows better performance than the classical ad-hoc techniques based on the first derivations of Moose. In the maximum a posteriori performance viewpoint, it has even been proved that that technique is optimal.

The invention claimed is:

1. A process for estimating a carrier frequency offset (CFO) θ in a receiver of an Orthogonal Frequency Division Multiplex (OFDM) communication system, said process comprising:

receiving a sequence $y=(y_0, y_1, y_2 \ldots, y_{N-1})^T$ corresponding to a pilot sequence $x=(x_0, x_1, x_2 \ldots, x_{N-1})^T$ transmitted by a base station, where N in an integer corresponding to a size of the sequence and $^T$ indicates a transposing operator;

determining a value of θ which maximizes a function defined as:

$$C(\theta) = -d_\theta^H Y^H X (X^H X + \sigma^2 Q^{-1})^{-1} \frac{1}{\sigma^2} X^H Y d_\theta$$

where X is a matrix built using the pilot sequence as:

$$X = \begin{pmatrix} x_0 & x_{N-1} & \ldots & x_{N-L-1} \\ x_1 & x_0 & \ldots & x_{N-L-2} \\ \vdots & \vdots & \vdots & \vdots \\ x_{L-2} & x_{L-3} & \ldots & x_{N-1} \\ x_{L-1} & x_{L-2} & \ldots & x_0 \\ \vdots & \vdots & \vdots & \vdots \\ x_{N-1} & x_{N-2} & \ldots & x_{N-L} \end{pmatrix}$$

L being a presumed length of a channel used to transmit the pilot signal, $d_\theta$ is a function defined as:

$$d_\theta = \left(1, e^{2\pi \frac{i\theta}{N}}, \ldots, e^{2\pi \frac{(N-1)i\theta}{N}}\right)^T,$$

i being a complex number such that $i^2=-1$;

Y is a diagonal matrix having y on a main diagonal thereof;

$\sigma^2$ is a variance of noise and Q is a time covariance matrix of the channel.

2. The process according to claim 1, wherein said time covariance matrix Q is set to be equal to $1/L\ I_L$, with $I_L$ being a L×L identity matrix.

3. The process according to claim 1 wherein a dichotomy process is used for estimating the value of θ which maximizes C(θ).

4. The process according to claim 1 wherein said time covariance matrix Q is contextually determined from a physical location of the receiver.

5. The process according to claim 1, further comprising:
detecting (22) said pilot signal;
computing (23) an estimation of the variance of the noise $\sigma^2$;
setting an estimation (24) of the time covariance matrix Q;

computing elements $A_{n,m}$ of a matrix A defined as follows:

$$A = Y^H X (X^H X + \sigma^2 Q^{-1})^{-1} \frac{1}{\sigma^2} X^H Y$$

computing (26) values $\tilde{a}_k$ where k=1, ..., N−1 as:

$$\tilde{a}_k = \sum_{m=1}^{N-k} A_{k+m,m}$$

computing (27) vectors:

$$\tilde{b}_\Re^T = \Re[\tilde{a}_1, 2\tilde{a}_2, \ldots, (N-1)\tilde{a}_{N-1}]$$

$$\tilde{b}_\Im^T = \Im[\tilde{a}_1, 2\tilde{a}_2, \ldots, (N-1)\tilde{a}_{N-1}]$$

initializing (29) a loop with two variables:
$\theta_{min} = -\frac{1}{2}$ and
$\theta_{max} = \frac{1}{2}$
computing (30) a value of $$d = \tilde{b}_\Re^T \cdot s_\theta + \tilde{b}_\Im^T \cdot c_\theta$$

with vectors $c_\theta^T$ and defined $c_\theta^T$ as $$c_\theta^T = [\cos(2\pi\theta/N), \ldots, \cos(2\pi(N-1)\theta/N)]$$

$$s_\theta^T = [\sin(2\pi\theta/N), \ldots, \sin(2\pi(N-1)\theta/N)]$$

testing (31) a sign of d;
if d is positive, then updating (32) the value of $\theta_{min}$ as follows:

$$\theta_{min} = (\theta_{min} + \theta_{max})/2$$

if d is negative, then updating (33) the value of $\theta_{max}$ as follows:

$$\theta_{max} = (\theta_{min} + \theta_{max})/2$$

repeating (29)-(33) until a predefined stopping requirement is met;
outputting an estimation of said CFO $\hat{\theta}$ as:

$$\hat{\theta} = [\theta_{min} + \theta_{max}]/2.$$

6. The process according to claim 5, wherein only upper right coefficients $A_{n,m}$, with n>m, are being computed.

7. The process according to claim 1, wherein said pilot sequence is a Primary Synchronization Signal.

8. The process according to claim 1, wherein said receiver is a 3GPP-LTE communication system.

9. The apparatus according to claim 1, wherein the said receiver is a 3GPP-LTE communication system.

10. An apparatus for an Orthogonal Frequency Division Multiplexing communication system comprising:
 a receiver for receiving an input signal $y=(y_0, y_1, y_2, \ldots, y_{N-1})^T$ corresponding to a pilot sequence $x=(x_0, x_1, x_2, \ldots, x_{N-1})^T$ transmitted by a base station, where N in an integer corresponding to a size of the sequence and $T$ indicates a transposing operator; and
 a processor configured to determine a value of θ which maximizes a function:

$$C(\theta) = -d_\theta^H Y^H X (X^H X + \sigma^2 Q^{-1})^{-1} \frac{1}{\sigma^2} X^H Y d_\theta$$

where X is a matrix built using the pilot sequence as:

$$X = \begin{pmatrix} x_0 & x_{N-1} & \cdots & x_{N-L-1} \\ x_1 & x_0 & \cdots & x_{N-L-2} \\ \vdots & \vdots & \vdots & \vdots \\ x_{L-2} & x_{L-3} & \cdots & x_{N-1} \\ x_{L-1} & x_{L-2} & \cdots & x_0 \\ \vdots & \vdots & \vdots & \vdots \\ x_{N-1} & x_{N-2} & \cdots & x_{N-L} \end{pmatrix}$$

L being a presumed length of a channel used to transmit the pilot signal, $d_\theta$ is a function defined as:

$$d_\theta = \left(1, e^{2\pi \frac{i\theta}{N}}, \ldots, e^{2\pi \frac{(N-1)i\theta}{N}}\right)^T,$$

i being a complex number such that $i^2 = -1$;
Y is a diagonal matrix having y on a main diagonal thereof;
$\sigma^2$ is a variance of noise and Q is a time covariance matrix of the channel.

11. The apparatus according to claim 10, wherein said time covariance matrix Q is set to be equal to $1/L\, I_L$, with $I_L$ being an L×L identity matrix.

12. The apparatus according to claim 10 wherein the processor is configured to perform a dichotomic computation of the value of θ which maximizes C(θ).

13. The apparatus according to claim 10, wherein said pilot sequence is a Primary Synchronization Signal.

* * * * *